(12) United States Patent
Tanaka et al.

(10) Patent No.: US 7,021,582 B2
(45) Date of Patent: Apr. 4, 2006

(54) MOTORIZED SEAT BELT RETRACTOR (75) Inventors: Koji Tanaka, Tokyo (JP); Hiromasa Tanji, Tokyo (JP); Hideaki Yano, Tokyo (JP); Hiroaki Fujii, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/713,210

(22) Filed: Nov. 17, 2003

(65) Prior Publication Data
US 2004/0069891 A1 Apr. 15, 2004

Related U.S. Application Data (62) Division of application No. 09/838,281, filed on Apr. 20, 2001, now Pat. No. 6,676,060.

(60) Provisional application No. 60/198,751, filed on Apr. 21, 2000.

(51) Int. Cl.
*B65H 75/48* (2006.01)

(52) U.S. Cl. .............................. 242/390.8; 242/379.1; 280/805; 280/807

(58) Field of Classification Search ............ 242/390.8, 242/390.9, 379.1; 280/805, 807; 297/470, 297/475, 476, 477, 478
See application file for complete search history.

(56) References Cited

U.S. PATENT DOCUMENTS

| 4,444,010 | A | 4/1984 | Bendler |
| 4,966,395 | A | 10/1990 | Hendrickson |
| 5,690,295 | A | 11/1997 | Steinberg et al. |
| 5,881,962 | A | 3/1999 | Schmidt et al. |
| 6,290,159 | B1 | 9/2001 | Specht et al. |

FOREIGN PATENT DOCUMENTS

| DE | 195 12 660 | 10/1995 |
| DE | 199 09 938 | 8/2000 |
| DE | 100 08 824 | 9/2000 |
| EP | 0 680 856 | 3/1995 |
| GB | 2347 124 | 8/2000 |
| JP | 2001-63519 | 3/2001 |
| JP | 2001-063520 | 3/2001 |
| WO | WO 95/27638 | 10/1995 |
| WO | WO 96/25310 | 8/1996 |

OTHER PUBLICATIONS

Maloney, Timothy J., Industrial Solid-State Electronics, 1979, Prentice-Hall, pp. 512-515.*

* cited by examiner

*Primary Examiner*—John Q. Nguyen
(74) *Attorney, Agent, or Firm*—Foley & Lardner LLP (57) ABSTRACT

A motorized seat belt retractor having a load limiter to control the tensile load on a seat belt webbing, especially when the webbing is withdrawn due to an emergency condition. The load limiter controls the tension by controlling the condition of the motor that drives the retractor.

10 Claims, 8 Drawing Sheets

MOTORIZED SEAT BELT RETRACTOR

CROSS REFERENCE TO RELATED APPLICATIONS

The present application is a divisional application of U.S. patent application Ser. No. 09/838,281 now U.S. Pat. No. 6,676,060, filed on Apr. 20, 2001 claiming priority to and the benefit of U.S. Provisional Patent Application Ser. No. 60/198,751 filed Apr. 21, 2000. The foregoing applications are each incorporated by reference herein in their entireties.

BACKGROUND OF THE INVENTION

The present invention relates to a seat belt retractor with a load limiter and a locking mechanism. More particularly, the present invention relates to a retractor having a motorized load limiter and locking mechansim.

Conventionally, retractors have include a mechanical load limiter such as a torsion bar or the like for limiting the load applied on a shoulder or chest of an occupant of a motor vehicle. In these conventional retractors the mechanical type of load limiter does not allow for the threshold setting for load on the webbing to be altered. Typically, the threshold value for the amount of tensile load to be applied to the webbing is determined according to the model type of automobile. This threshold value is fixed and cannot be easily altered.

Therefore, it is desired to develop a novel retractor in which the threshold value for tensile load on the seat belt webbing is adjustable.

SUMMARY OF THE INVENTION

To achieve the aforementioned object, the present invention provides a motorized seat belt retractor having a load limiter for controlling the tensile load on a webbing withdrawn in the event of emergency. The load limiter utilizes force generated by rotation of the motor shaft to control the tensile load. This approach to a load limiter is novel and may include a high-voltage motor having improved motor current rising characteristics during starting of the motor.

According to the structure of the present invention, the force generated by the rotation of the shaft of the motor can be utilized as the tensile load for the load limiter. This configuration allows for the easy adjustment of the threshold value of the tensile load on the webbing and permits the threshold value to be set over a wider range of possible values.

The load limiter of the motorized seat belt retractor includes a rotational resistance generating means which generates a rotational resistance force in response to the rotation of the shaft of the motor. According to this structure, during rotation of the shaft of the motor a rotational resistance force is generated due to the inertial moment of the shaft, this rotational resistance force can be positively utilized to control the tensile load on the webbing.

In the aforementioned motorized seat belt retractor which includes a load limiter for controlling the tensile load on a webbing withdrawn due to forward movement of an occupant in the event of emergency, the load limiter includes a rotational resistance generating means which provides for the generation of a rotational resistance force by the motor when the motor is short circuited. According to this structure, the rotational resistance force generated by the motor when short circuited can be positively utilized as the tensile load for the load limiter, thereby eliminating the necessity of a separate mechanical load limiter. Thus, the present invention provides for manufacturing motorized seat belt retractors of a smaller size and at a low cost.

According to the present invention, the rotational resistance generating means of the motorized seat belt retractor generates a rotational resistance force by switching the motor into either the short circuited state or the non-short circuited state according to predetermined sequence control. According to this structure, a desired tensile load on the webbing can be obtained by suitably setting the period in which the motor is in the short circuited state and the period in which the motor is in the non-short circuited state and sequentially switching the short circuited state and the non-short circuited state of the motor.

In the motorized seat belt retractor, the non-short circuited state can mean that the motor is energized. According to this structure, the tensile load on the webbing can be controlled by utilizing the rotational torque of the motor. The rotational resistance force of the motor in the non-short circuited state (i.e., energized state) is adjustable, thereby allowing a wider range for the setting value of the tensile load on the webbing.

In the motorized seat belt retractor, the non-short circuited state can mean that the motor is electrically connected via a resistor. According to this structure, the rotational resistance force of the motor in the non-short circuited state can be adjusted by changing the resistance value of the resistor, thereby allowing a wider range for the setting value of the tensile load on the webbing.

In the motorized seat belt retractor, the non-short circuited state can mean that the motor is electrically open. According to this structure, little rotational resistance force is generated by the motor in the non-short circuited state when the motor is electrically disconnected (open-circuit), thereby easily allowing a wider range for the setting value of the tensile load on the webbing at a low cost without any complex mechanism.

The load limiter of the motorized seat belt retractor includes a gear train which couples the shaft of the motor to a spool on which the webbing is wound. According to this structure, the tensile load on the webbing can be controlled not only by adjusting the rotational resistance force of the motor but also by changing the gear ratio of the gear train.

In the aforementioned rotational resistance generating means which generates rotational resistance force by the motor, the rotational resistance force further acts for preventing a rotational shaft of a motor from rotating in a direction of withdrawing the webbing. According to this structure, the rotating shaft of the motor is electrically locked, thus preventing rotation of the shaft at a suitable timing.

According to the present invention, described in general above, it is preferred that the rotational resistance force be generated at least by counter-electromotive force generated by the rotation of the rotational shaft of the motor when short circuited. According to this structure, the counter-electromotive force generated by the rotation of the rotational shaft of the motor when short circuited can be utilized as the locking mechanism, thereby eliminating specific control for driving the motor.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereinafter, an embodiment of the present invention will now be described with reference to the drawings. It should be understood that the sizes, shapes, positional relation of respective components are schematically shown just for understanding the invention and that the numerical conditions stated in the following are just illustrative examples.

Figure 1:
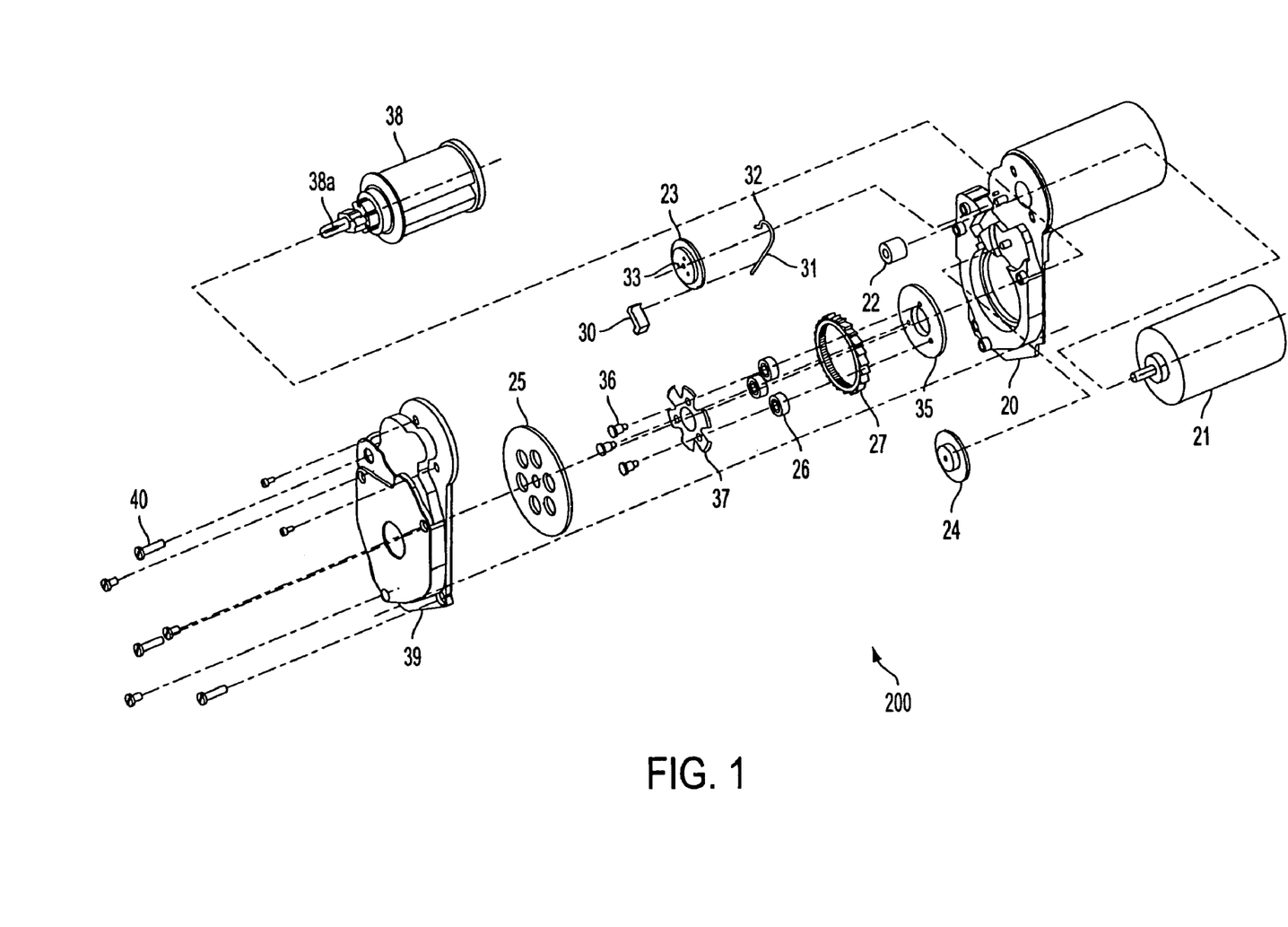
FIG. 1 is an exploded perspective view showing an embodiment of a retractor according to the present invention.
Figure 2:
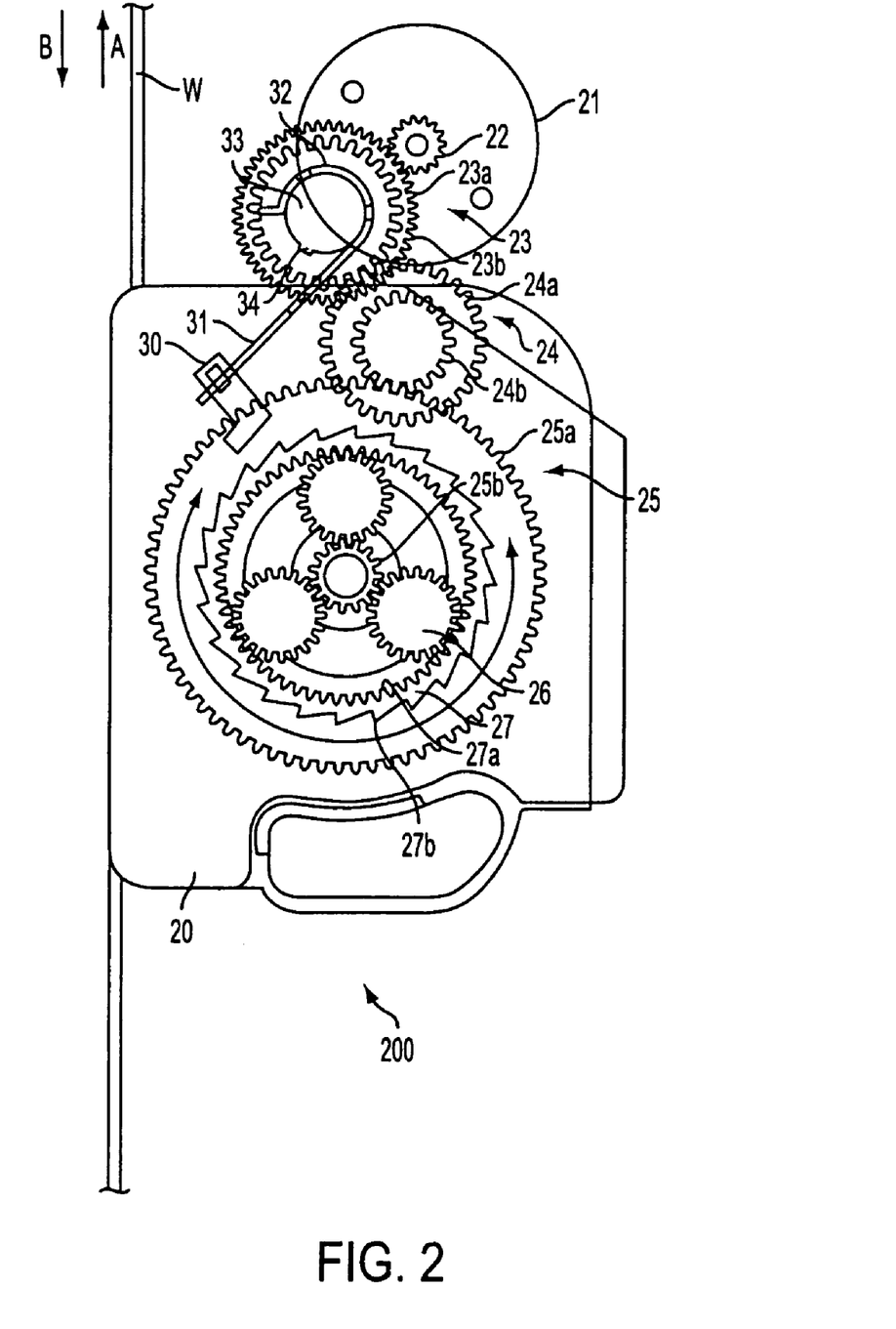
FIG. 2 is an explanatory view showing the mesh relation between gears of the retractor of the embodiment according to the present invention.

Hereinafter, an embodiment of a retractor according to the present invention will be described. FIG. 1 is an exploded perspective view showing the embodiment of the retractor according to the present invention. FIG. 2 is an explanatory view showing the mesh relation between gears of the retractor of this embodiment. It should be noted that the illustration of a pyrotechnic pretension mechanism is omitted in FIG. 1.

The structure of the retractor of this embodiment will now be described with reference to FIGS. 1, 2. The retractor 200 comprises the following components: a retainer 20; a DC motor 21 attached integrally to the retainer 20; a pinion 22 attached integrally to a motor shaft of the DC motor 21; a first gear 23 which is journalled by a projection formed on the retainer 20 and is in mesh or engaged with the pinion 22. The first gear 23 is preferably an integral double gear comprising a large gear 23a and a small gear 23b. The pinion 22 is positioned to mesh with the large gear 23a.

The retractor also includes a second gear 24 which is journalled by a projection formed on the retainer 20 and is in mesh or engaged with the first gear 23. In particular, the retainer is engaged with the small gear 23b. The second gear 24 is preferably an integral double gear comprising a large gear 24a and a small gear 24b. The small gear 23b is in mesh or engaged with the large gear 24a.

The retractor further includes a third gear 25 which is in mesh with the second gear 24. In particular, the third gear is engaged with the small gear 24b. The third gear 25 is preferably an integral double gear comprising a large gear 25a and a small gear 25b. The small gear 24b is in mesh with the large gear 25a.

The retractor also includes three planetary gears 26 which are in mesh with the third gear 25. The planetary gears engage the small gear 25b. An internal gear 27 is also provided. The internal gear 27 has internal teeth 27a which engage with the three planetary gears 26. The internal gear 27 includes external ratchet teeth 27b formed in the outer periphery of the internal gear 27.

A pawl 30 is provided to engage with the external ratchet teeth 27b, and to thereby stop the rotation of the internal gear 27 in the clockwise direction. The pawl 30 is supported at a lever 31 comprising a spring at an end connected to the pawl 30. The other end of the lever 31 includes a portion curled to form a ring member 32 that is formed in a curled portion of the other end of the lever 31. The ring member 32 is wound on a projecting disk-like member 33. The disk-like member 33 is integrally formed coaxially with the first gear 23. A frictional piece 34 projects from the outer periphery of the disk-like member 33 and presses against the ring member 32 to apply friction.

The three planetary gears 26 are positioned on a carrier 35. Three pins 36 are provided for rotatably supporting and securing the three planetary gears 26 to the carrier 35. A speed-reduction plate 37 is interposed between the three pins 36 and the three planetary gears 26.

Figure 3A:
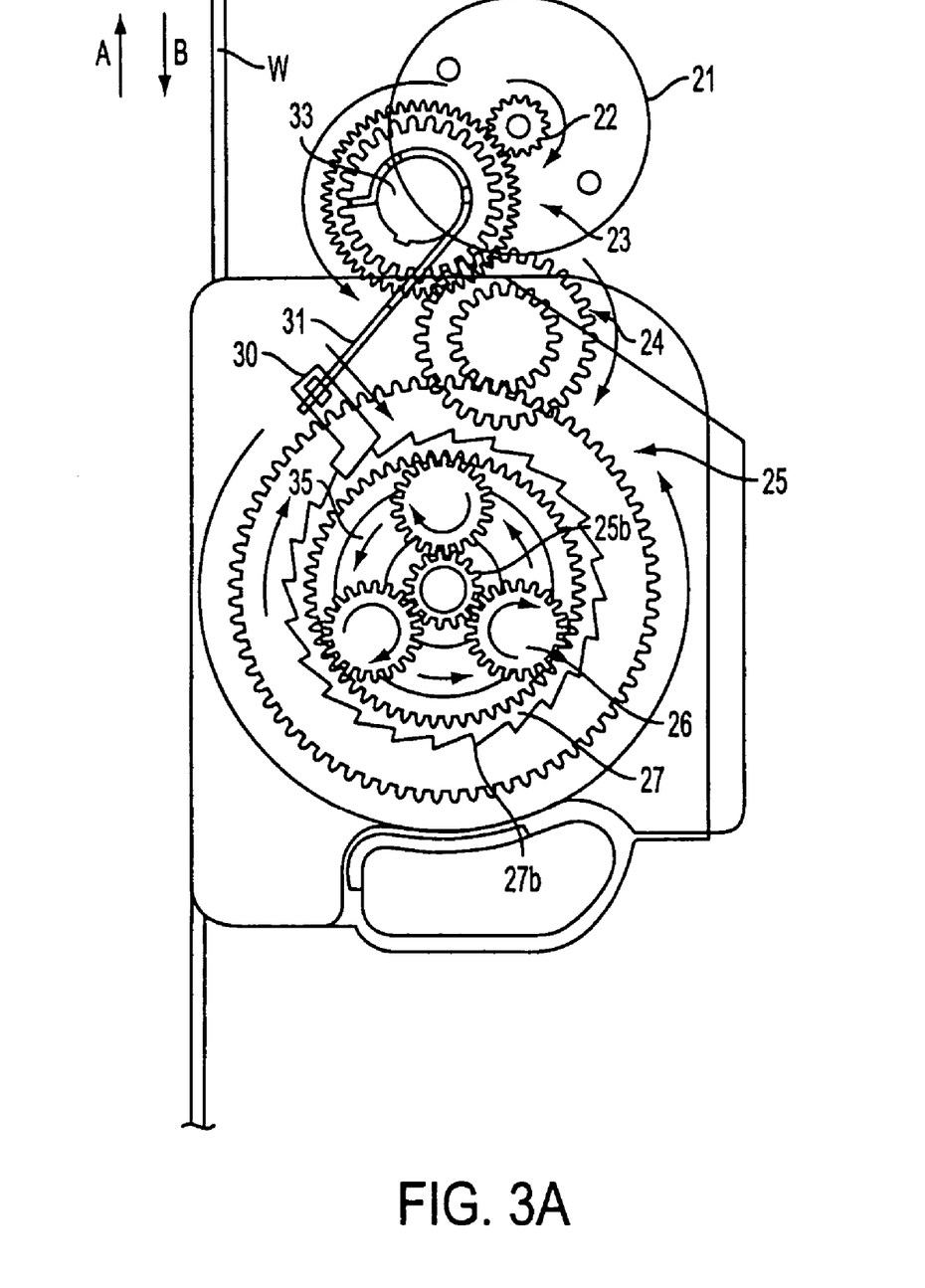
FIG. 3a is a view illustrating a state where the motor is rotated in the clockwise direction (CW direction) and FIG. 3b is a view illustrating a state where the motor is rotated in the counterclockwise direction (CCW direction).
Figure 3B:
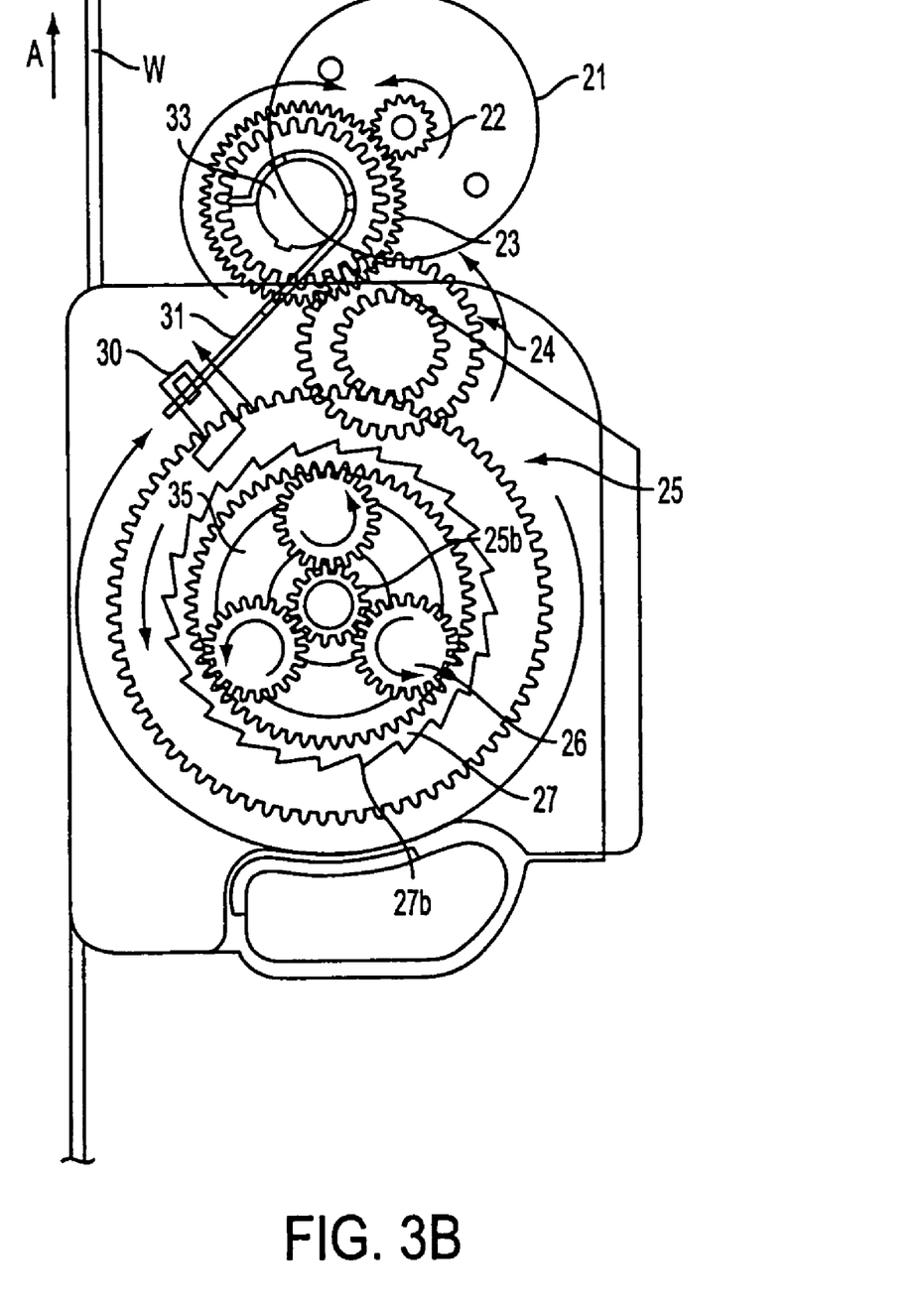

A webbing W for restraining an occupant's body of which one end is fixed to a spool 38. As shown in FIGS. 2 and 3 arrow A designates a direction of withdrawing the webbing W and arrow B designates a direction of retracting the webbing W. The spool 38 includes a tip portion 38a that passes through a rotational central hole of the carrier 35. The tip portion 38a also passes through the rotational central hole of the third gear so as to be both slidable and rotatable relative to the third gear. On the other hand, the root of the tip portion 38a is fitted and fixed to the carrier 35.

The retractor includes a cover 39 covering the entire of the force transfer mechanism or gear train. A plurality of screws 40 are provided for fixing the cover 39 to the retainer 20.

A control circuit controls the connection of the DC motor 21 to be short-circuited or non-short-ciruited and also controls the rotation of the DC motor 21 in the clockwise (CW) direction or in the counterclockwise (CCW) direction.

As described herein, when the motor 21 is short circuited, no driving current is supplied to turn the motor shaft. In this condition, when the shaft of the motor attempts to rotate due to the rotational force transferred from the first gear and engaged pinion a counter electromotive force resists movement of the motor shaft.

As described herein, when the motor is non-short-circuited the motor may be located in an open-circuit or may be connected to a DC power source which supplies a driving current that generates a rotational force to drive the shaft in a chosen direction.

Hereinafter, description will now be made as regard to the operation of the retractor of the present invention with the aforementioned components.

FIGS. 3(A) and 3(B) illustrating the operation of this embodiment wherein FIG. 3(A) is a view illustrating a state where the motor is rotated in the clockwise direction (CW direction) and FIG. 3(B) is a view illustrating a state where the motor is rotated in the counterclockwise direction (CCW direction).

In the retractor 200, as shown in FIG. 2 and FIG. 3(B), the engaging pawl 30 is spaced apart from the external ratchet teeth 27b so that the internal gear 27 is not restricted in the normal state (i.e., not in an emergency such as emergency braking or a vehicle collision). In this normal state, because of the property of the planetary gear train, the rotational torque of the carrier 35 is not transmitted to the third gear. Therefore, the rotational torque of the spool 38 integrally fitted and fixed to the carrier 35 is not transmitted to the rotational shaft of the DC motor 21, which is indirectly engaged with the third gear.

In the event of emergency, such as emergency braking and a vehicle collision, a pretensioning mechanism (for winding up the webbing W to increase the tension prior to the pyrotechnic pretension mechanism) is actuated according to output signals from an ABS (anti-skid or brake) mechanism (not shown) and/or a collision predictive device (not shown) in order to rotate the rotational shaft of the DC motor 21 in the CW direction as shown by the arrow in FIG. 3(A). Then, the rotational torque of the pinion 22 in the clockwise direction is transmitted to the first gear 23 as a rotational torque in the counterclockwise direction (indicated by arrow). As a result, the pawl 30 engages with one of the external ratchet teeth 27b of the internal gear 27 to stop the rotation of the internal gear 27 in the clockwise direction (indicated by arrow). Therefore, the rotational torque of the third gear 25 can be transmitted to the carrier 35, which is integrally fitted and fixed to the spool 38.

In the case of the emergency condition, the rotational torque of the first gear 23 is transmitted to the second gear 24 as rotational torque in the clockwise direction (indicated by arrow). In addition, the torque is further transmitted to the third gear 25 as rotational torque in the counterclockwise direction (indicated by arrow). Due to the rotation of the third gear 25 in the counterclockwise direction, the small gear 25b of the third gear 25 is rotated in the counterclockwise direction so as to apply rotational torque in the clockwise direction (indicated by arrow) to the three planetary gears 26. The three planetary gears 26 rotate in the counterclockwise direction (indicated by arrow) like planets around the small gear 25b and, during this rotation, engage with the internal teeth of the internal gear 27. The internal gear 27 is stopped from rotating by the pawl 30. Therefore, the carrier 35 rotates to journal the three planetary gears 26 in the counterclockwise direction (indicated by arrow). Because the spool 38 is fitted and fixed to the carrier 35, which is rotating in the counterclockwise direction, the spool also rotates in the counter clockwise direction to wind up the webbing W (in the direction of arrow B).

Thereby, as described above, the rotational torque generated by the shaft of the DC motor 21 rotating in the clockwise direction is transmitted to the spool 38 as rotational torque for winding up the webbing W.

As impact is exerted on a vehicle body due to a vehicle collision, impact detecting signals are outputted from an acceleration sensor (not shown) and/or a crush sensor (not shown) whereby a pyrotechnic pretension mechanism (not shown) is actuated to retract the webbing W into the retractor 200, as described above, thereby ensuring initial restraint of the occupant.

After the collision or impact occurs, the webbing W will be withdrawn (in a direction of arrow A in FIG. 3(A)) by the inertial force of the occupant moving forwardly due to the collision. During this movement of the webbing W and the spool 38, as shown in FIG. 3(A), the torque applied to the spool 38 by withdrawing of the webbing W is transmitted to the DC motor 21 as rotational torque in the counterclockwise direction (in a direction opposite to the direction of arrow) because the engaging pawl 30 is engaged with the external ratchet teeth 27b. When the DC motor is short-circuited (i.e., the terminals are connected, but no external voltage is applied), the movement of the DC motor shaft created by the occupant's motion is opposed by a counter electromotive force ("counter emf"). As a result, the motor shaft provides a rotational resistance force that acts to prevent the rotation of the spool 38 and withdrawal of the webbing W.

The present invention provides for using the rotational resistance force created by the rotating DC motor shaft to provide a locking mechanism and/or the EA mechanism. It should be noted that the term "EA" is an abbreviation for "energy absorbing" meaning that impact (load) acting on an occupant's body is absorbed by a seat belt, and this term will be used generally hereinafter.

Figure 4:
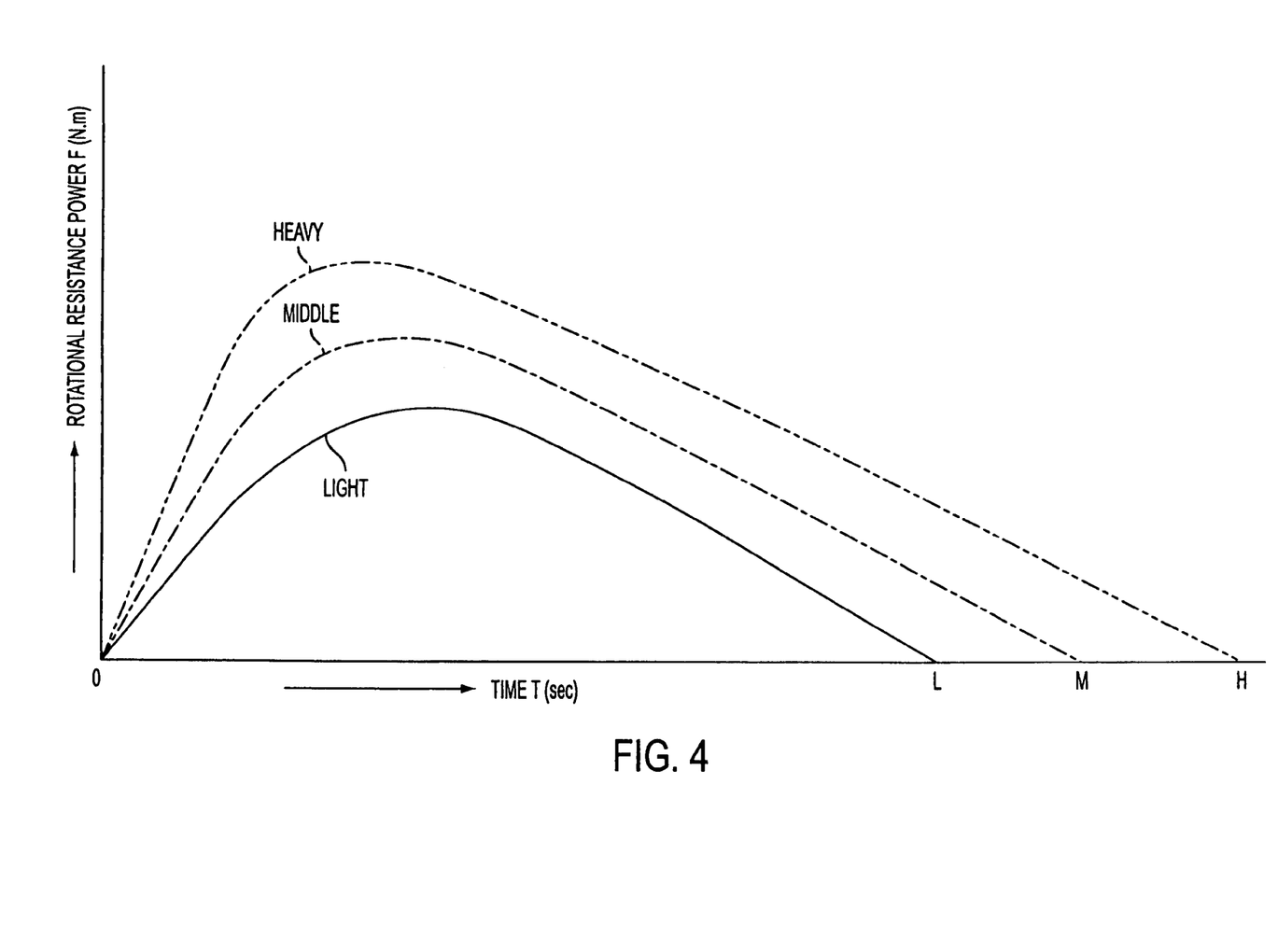
FIG. 4 is a graph schematically showing the relation between the rotational resistance force F [Nm] (Newton meter) of the short-circuited DC motor and time T [sec] (second) from a point where a vehicle collides with a wall (0 point in this figure) to a point where the vehicle completely crashes. Curves indicate cases which are different in the weight (Light, Middle, Heavy) of occupant in the vehicle, respectively.

The characteristics of the rotational resistance force will now be described with reference to the drawings. FIG. 4 is a graph schematically showing the relation between the rotational resistance force F [Nm] (Newton meter) provided by the short-circuited DC motor and time T [sec] (second) from a point where a vehicle collides with a wall (0 point of this graph) to a point where the vehicle completely crashes. The three curves shown in FIG. 4, indicate situations where different weight occupants were located in the vehicle (i.e., Light, Middle and Heavy occupants).

Figure 5:
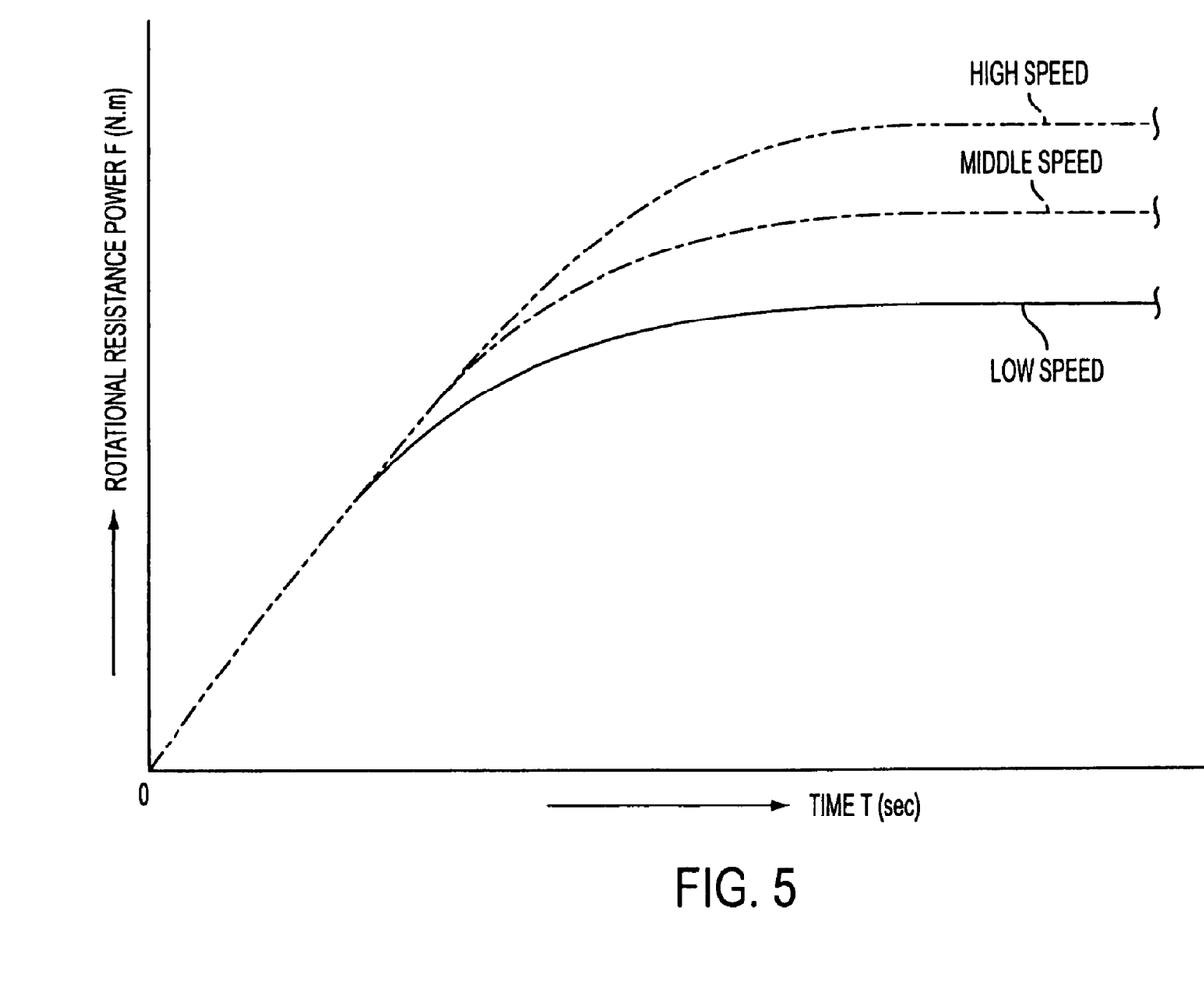
FIG. 5 is a graph schematically showing the relation between therotational resistance force F [Nm] (Newton meter) of the short-circuited DC motor and time T [sec] (second) from a point where a vehicle collides with a wall (0 point in this figure) to a point where the vehicle completely crashes. Curves indicate cases which are different in the collision speed (Low, Middle, High) of the vehicle, respectively.

FIG. 5 is a graph schematically showing the relation between the rotational resistance force F [Nm] (Newton meter) of the short-circuited DC motor and time T [sec] (second) from a point where a vehicle collides with a wall (0 point of this graph) to a point where the vehicle completely crashes or comes to rest. Curves indicate cases which are different in the collision speed (Low, Middle, High) of the vehicle, respectively.

As shown in FIG. 4, in the case of a light-weight occupant, the rising slope or inclination of the curve is relatively gentle (the solid line in the graph of FIG. 4). In the case of a heavy-weight occupant, the rising inclination of the curve is steep (the two-dot chain line shown in FIG. 4). In the case of a medium-weight occupant, the rising inclination of the curve is middle between the case of the light-weight occupant and the case of the heavy-weight occupant. Regardless of the occupant's weight, the descending slope or inclination of all of the cases are gentle.

Accordingly, by using the rotational resistance force as the EA mechanism, EA load is relatively gently increased against the light-weight occupant so that the total load on the light-weight occupant is relatively small. On the other hand, EA load is relatively steeply increased against the heavy-weight occupant so that the total load on the heavy-weight occupant is relatively large. The decrease in EA load is gentle regardless of the occupant's weight, achieving "soft landing" (it means "decrease in belt tension acting on the occupant is gentle with time elapsing").

As shown in FIG. 5, the higher the speed of the vehicle when colliding with a wall, the higher the load limit of the rotational resistance force F (EA load limit) (the two-dot chain line in the graph of FIG. 5). The lower the speed of the vehicle when colliding with a wall, the lower the load limit of the rotational resistance force F (the solid line in the graph of FIG. 5). That is, the load limit is increased or decreased depending on the collision speed, exhibiting the ideal occupant restraint performance.

In case of conventional mechanical EA mechanism (e.g. a torsion bar) the rising inclination of EA load is constant so that the load limit is also constant regardless of the occupant's weight and the collision speed. The present invention improves on conventional methods and devices.

The load limit can be freely set in various manners as follows. For example, The gear ratio of the gears located between the shaft of the DC motor 21 and the web spool 38 may be changed. A change in gear ratio changes the load limit of the rotational resistance force transmitted from the motor 21 to the spool 38. Also, a change in gear ratio changes the rising and descending slope of the force over time shown in FIG. 4.

Figure 6A:
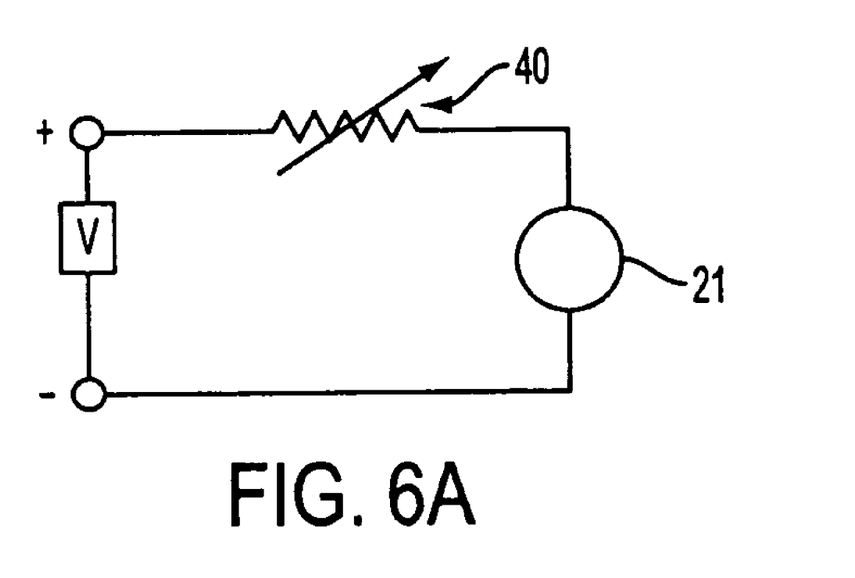
FIG. 6a is a circuit diagram of the circuit including the retractor dc motor and a variable resistor.

Further by way of example, the DC motor 21 may be attached to a circuit that includes a variable resistor 40, as shown in FIG. 6a. The value of the resistor 40 may be changed in order to change the load limit of the force being transferred from the motor to the web spool 38. Similarly, the value of resistance may be changed to adjust the rising inclination and the descending inclination of the curves shown in FIG. 4. As the value of resistance is increased, the amount of force transferred from the motor 21 to the web spool 38 decreases. As a result, the load limit decreases, the rising inclination becomes gentler, and the descending inclination becomes steeper. In this case, a plurality of resistors having different values of resistance may be positioned in parallel and selectably connected to the circuit in such a manner as to automatically connect to a resistor having a value best suited to achieve ideal restraint performance.

Figure 6B:
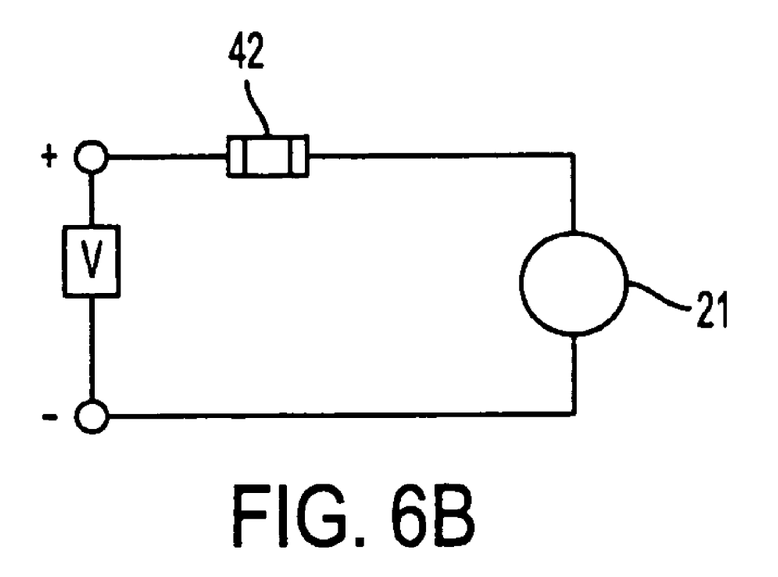
FIG. 6b is a circuit diagram of the circuit including the retractor dc motor and a fuse.

Still further by way of example, a fuse 42 may be connected to the power supply for the motor 21, as shown in FIG. 6b. The EA mechanism provided by the motor 21 can be released by opening the fuse and open-circuiting the motor to lower the EA load when current exceeds a predetermined value.

As described above, the DC motor 21 may be energized by a driving current to rotate in a direction for retracting the webbing W (the direction of arrow in FIG. 3(A)). Rotation in this direction provides a rotational resistance force opposite to the force provided by the occupant. On the contrary, the rotational shaft of the DC motor 21 may be rotated in the direction of withdrawing the webbing W (the direction opposite to the direction of arrow in FIG. 3(A)), to provide a force that subtracts from the conventional rotational resistance force.

The load limiter can also function as a locking mechanism, by providing sufficient rotational resistance force to cancel the rotational torque of the spool 38 acting in a direction of withdrawing the seat belt.

Alternatively, the motor 21 may be replaced with another one having different output. Thus, the load limit of the rotational resistance force F, the rising inclination, and the descending inclination can be adjusted by changing the motor rating.

Figure 7:
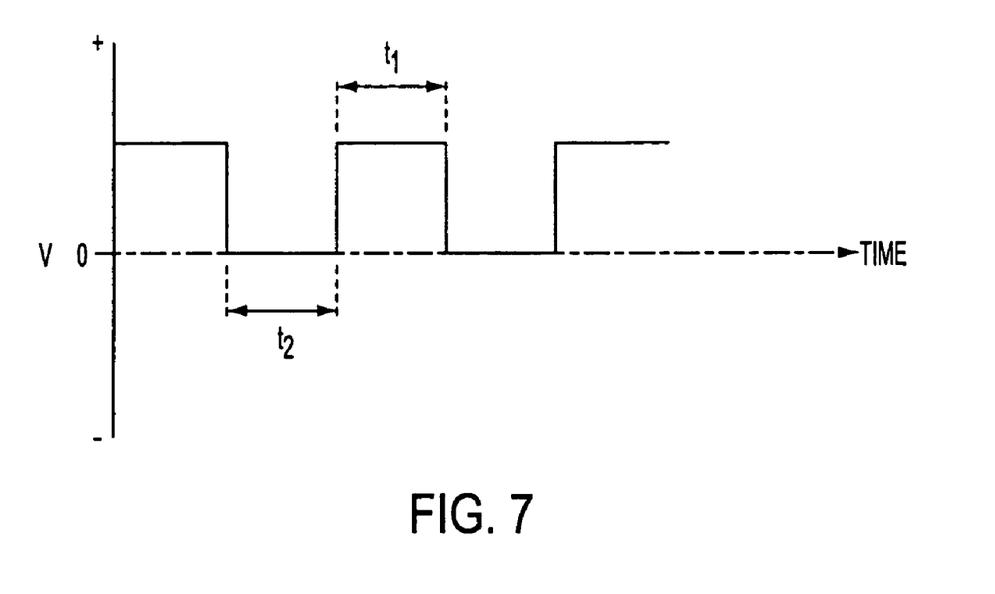
FIG. 7 is a graph of the dc current/voltage applied to the retractor motor versus time.

As shown in FIG. 7, the time period t1 of short circuit of the DC motor 21 and the time period t2 of non-short circuit of the DC motor 21 may be freely changed to make a pulse-like rectangular wave in order to adjust the load limit of the rotational resistance force F, the rising inclination, and the descending inclination of the resistance force. For instance, as the time period t1 is set longer than the time period t2, the load limit becomes higher, the rising inclination becomes steeper, and the descending inclination becomes gentler. On the contrary, as the time period t2 is set longer than the time period t1, the load limit becomes lower, the rising inclination becomes gentler, and the descending inclination becomes steeper.

The timing for starting the EA mechanism can be controlled by an ECU ("Electronic Control Unit") for commanding the ignition timing of an airbag device or an ECU for a pretension mechanism.

It is preferable that the load limit of the rotational resistance force F, the rising inclination, and the descending inclination are suitably set according to the withdrawal characteristic of webbing W which is obtained from experiments using real cars with dummies.

A rotational shaft with a magnet in a copper tube may be used instead of the DC motor 21, thereby removing the requirement to energize the motor and, thus, making EA mechanism at a low cost and with a simple structure.

Combinations of the EA mechanism and various pretension mechanisms such as a back pretensioner may provide more advantages. Further, a vehicle sensor may be incorporated in the retractor as an EA switch.

The method of using the rotational resistance force of the short-circuited motor as EA mechanism according to the present invention can be applied to a retractor of another type just like the aforementioned embodiment shown in FIG. 1.

As discussed above, the present invention achieves suitable timing of locking.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A motorized seat belt retractor comprising:
    a motor having a motor shaft;
    a load limiter for controlling the tensile load on a webbing withdrawn in the event of emergency; wherein the load limiter is configured to utilize a force generated by the rotation of the motor shaft to thereby control the tensile load on the webbing;
    wherein the load limit is controlled using a resistor located in series with the motor in an electrical circuit configured to carry a driving current to the motor, and
    wherein said load limiter is configured to control the tensile load on the webbing by alternatively placing the motor in a short-circuit and non-short-circuit condition according to a predetermined sequence.

2. The motorized seat belt retractor of claim 1, further comprising an electrical controller configured to established the predetermined sequence.

3. The motorized seat belt retractor of claim 1, wherein the resistor is a variable resistor.

4. The motorized seat belt retractor of claim 3, wherein the variable resistor is configured to control a counter electromotive force on the motor shaft and the tensile load on the webbing.

5. The motorized seat belt retractor of claim 1, wherein said load limiter includes a mechanism for transferring the force generated by the rotation of the motor shaft to the webbing.

6. The motorized seat belt retractor of claim 5, wherein said mechanism comprises a gear train which couples the shaft of the motor to a spool on which the webbing is wound.

7. The motorized seat belt retractor of claim 5, wherein said mechanism includes a locking mechanism to prevent the motor shaft from rotating in a direction corresponding to the webbing being withdrawn.

8. The motorized seat belt retractor of claim 1, wherein the load limiter is configured to increase the force generated by the motor at a rate based on the weight of a vehicle occupant.

9. The motorized seat belt retractor of claim 8, wherein the load limiter comprises is an electrical controller.

10. The motorized seat belt retractor of claim 9, wherein the load limiter only utilizes the force generated by the motor.

* * * * *